US010788083B1

(12) United States Patent
Inaba et al.

(10) Patent No.: US 10,788,083 B1
(45) Date of Patent: Sep. 29, 2020

(54) WORK VEHICLE

(71) Applicant: Kubota Corporation, Osaka-shi (JP)

(72) Inventors: Daisuke Inaba, Sakai (JP); Tomoya Omura, Sakai (JP); Akihide Nagao, Sakai (JP)

(73) Assignee: KUBOTA CORPORATION, Osaka-shi (JP)

( * ) Notice: Subject to any disclaimer, the term of this patent is extended or adjusted under 35 U.S.C. 154(b) by 0 days.

(21) Appl. No.: 16/846,415

(22) Filed: Apr. 13, 2020

(30) Foreign Application Priority Data

Aug. 9, 2019 (JP) .................................. 2019-147917

(51) Int. Cl.
| | |
|---|---|
| *B60K 23/02* | (2006.01) |
| *F16D 23/12* | (2006.01) |
| *G05G 1/46* | (2008.04) |
| *F16D 23/14* | (2006.01) |

(52) U.S. Cl.
CPC .............. *F16D 23/12* (2013.01); *B60K 23/02* (2013.01); *G05G 1/46* (2013.01); *B60Y 2200/221* (2013.01); *F16C 2361/43* (2013.01); *F16D 2023/141* (2013.01)

(58) Field of Classification Search
CPC ..... F16D 23/12; F16D 2023/141; G05G 1/46; B60K 23/02; B60Y 220/221; F16C 2361/43
See application file for complete search history.

(56) References Cited

U.S. PATENT DOCUMENTS

| | | | | | |
|---|---|---|---|---|---|
| 3,788,438 | A | * | 1/1974 | Reno | ....................... F16D 23/12 |
| | | | | | 192/110 R |
| 3,795,395 | A | * | 3/1974 | Ransom | .................. G07D 11/10 |
| | | | | | 271/4.06 |
| 4,227,603 | A | * | 10/1980 | Fasano | .................. F16D 13/752 |
| | | | | | 188/196 BA |
| 4,239,098 | A | * | 12/1980 | Jacoponi | ............... F16D 13/752 |
| | | | | | 192/111.12 |

(Continued)

FOREIGN PATENT DOCUMENTS

| | | |
|---|---|---|
| JP | 57-10925 U | 1/1982 |
| JP | 04-277325 | 10/1992 |

(Continued)

OTHER PUBLICATIONS

Japanese Office Action for corresponding JP Application No. 2019-147917, dated Oct. 1, 2019 (w/ machine translation).

*Primary Examiner* — David J Hlavka
(74) *Attorney, Agent, or Firm* — Mori & Ward, LLP

(57) ABSTRACT

A work vehicle includes a shaft supported by a cabin and having a center axis. A clutch pedal is supported by the shaft so as to be swingable about the center axis. A control cable includes an outer tube and an inner cable slidably inserted to the outer tube. The control cable is wound on a partition wall of the cabin and has flexibility. The at least one latch member is configured to latch the control cable onto the partition wall. The at least one retain member is configured to restrict the control cable from swelling within a winding region of the partition wall. The outer tube has a first longitudinal end connected to the cabin and a second longitudinal end connected to a clutch housing. The inner cable has a first longitudinal end connected to the clutch pedal and a second longitudinal end connected to the clutch lever.

18 Claims, 12 Drawing Sheets

(56) References Cited

U.S. PATENT DOCUMENTS

| | | | | | |
|---|---|---|---|---|---|
| 4,266,649 | A | * | 5/1981 | Falzoni | ................... F16D 23/12 |
| | | | | | 188/196 B |
| 5,119,913 | A | * | 6/1992 | Focqueur | ................ F16D 23/12 |
| | | | | | 192/103 R |
| 5,513,734 | A | * | 5/1996 | Scotti | ...................... F16D 21/06 |
| | | | | | 192/70.27 |
| 2006/0169569 | A1 | * | 8/2006 | Ooishi | ................... F16D 23/12 |
| | | | | | 192/99 S |
| 2018/0273119 | A1 | * | 9/2018 | Yoshida | ................. B60K 17/28 |

FOREIGN PATENT DOCUMENTS

| | | |
|---|---|---|
| JP | 05-001724 | 1/1993 |
| JP | 05-050157 U | 7/1993 |
| JP | 2000-103254 | 4/2000 |

\* cited by examiner

WORK VEHICLE

CROSS-REFERENCE TO RELATED APPLICATIONS

The present application claims priority under 35 U. S. C. § 119 to Japanese Patent Application No. 2019-147917, filed Aug. 9, 2019. The contents of this application are incorporated herein by reference in their entirety.

BACKGROUND OF THE INVENTION

Field of the Invention

The present application discloses a technique relating to a work vehicle.

Discussion of the Background

A mechanism configured to disconnect and connect a clutch in accordance with operation of a clutch pedal is exemplified in JP 05-001724 A, JP 05-050157 U, and JP 04-277325 A.

SUMMARY OF INVENTION

According to one aspect of the present invention, a work vehicle includes a cabin, a clutch, a shaft, a clutch pedal, a control cable, at least one latch member, and at least one retain member. The clutch includes a clutch housing and a clutch lever swingably provided at the clutch housing. The shaft is supported by the cabin and has a center axis. The clutch pedal is supported by the shaft so as to be swingable about the center axis. The control cable includes an outer tube and an inner cable slidably inserted to the outer tube. The control cable is wound on a partition wall of the cabin and has flexibility. The at least one latch member is configured to latch the control cable onto the partition wall of the cabin. The at least one retain member is configured to restrict the control cable from swelling within a winding region of the partition wall. The clutch is disconnected or connected when the clutch lever swings. The outer tube has a first longitudinal end connected to the cabin and a second longitudinal end connected to the clutch housing. The inner cable has a first longitudinal end connected to the clutch pedal and a second longitudinal end connected to the clutch lever.

According to another aspect of the present invention, a work vehicle includes a cabin, a clutch, a shaft, a clutch pedal, a clutch operation mechanism, a second shaft, a pedal component, a first pin, a first elastic member, a first link, a second pin, a second elastic member, and a second link. The clutch includes a clutch housing and a clutch lever swingably provided at the clutch housing. The shaft is supported by the cabin and has a center axis. The clutch pedal is supported by the shaft so as to be swingable about the center axis. The clutch operation mechanism includes a control cable, a first end, and a second end. The control cable includes an outer tube and an inner cable slidably inserted to the outer tube. The control cable is wound on a partition wall of the cabin and has flexibility. The outer tube has a first longitudinal end connected to the cabin and a second longitudinal end connected to the clutch housing. The inner cable has a first longitudinal end connected to the clutch pedal and a second longitudinal end connected to the clutch lever. The first end is the first longitudinal end of the inner cable. The second end is the second longitudinal end of the inner cable. The second shaft is supported by the partition wall and has a second rotary axis substantially in parallel with the center axis. The pedal component is supported by the shaft so as to be swingable about the center axis and has a third end and a fourth end positioned opposite to the third end with respect to the shaft. The third end is provided with the clutch pedal. The fourth end is connected to the second end of the clutch operation mechanism. The first pin is provided at the pedal component between the shaft and the third end of the pedal component and has a third rotary axis substantially in parallel with the center axis. The first elastic member is to bias the clutch operation mechanism such that the fourth end of the pedal component shifts toward the clutch. The first link is supported by the second shaft so as to be swingable about the second rotary axis and has a connection end. The second pin is provided at the first link and has a fourth rotary axis substantially in parallel with the second rotary axis. The second elastic member has a fifth end connected to the partition wall and a sixth end positioned opposite to the fifth end and connected to the connection end of the first link to swing the connection end about the second rotary axis to bias the connection end toward the partition wall. The second link is rotatably coupled to the first pin and the second pin. The clutch is disconnected or connected when the clutch lever swings, in a nonoperation state where no external force is applied to the clutch pedal, a first straight line passing the center axis and the third rotary axis crosses a line segment connecting the second rotary axis and the fourth rotary axis when viewed in an axial direction along the center axis. As a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
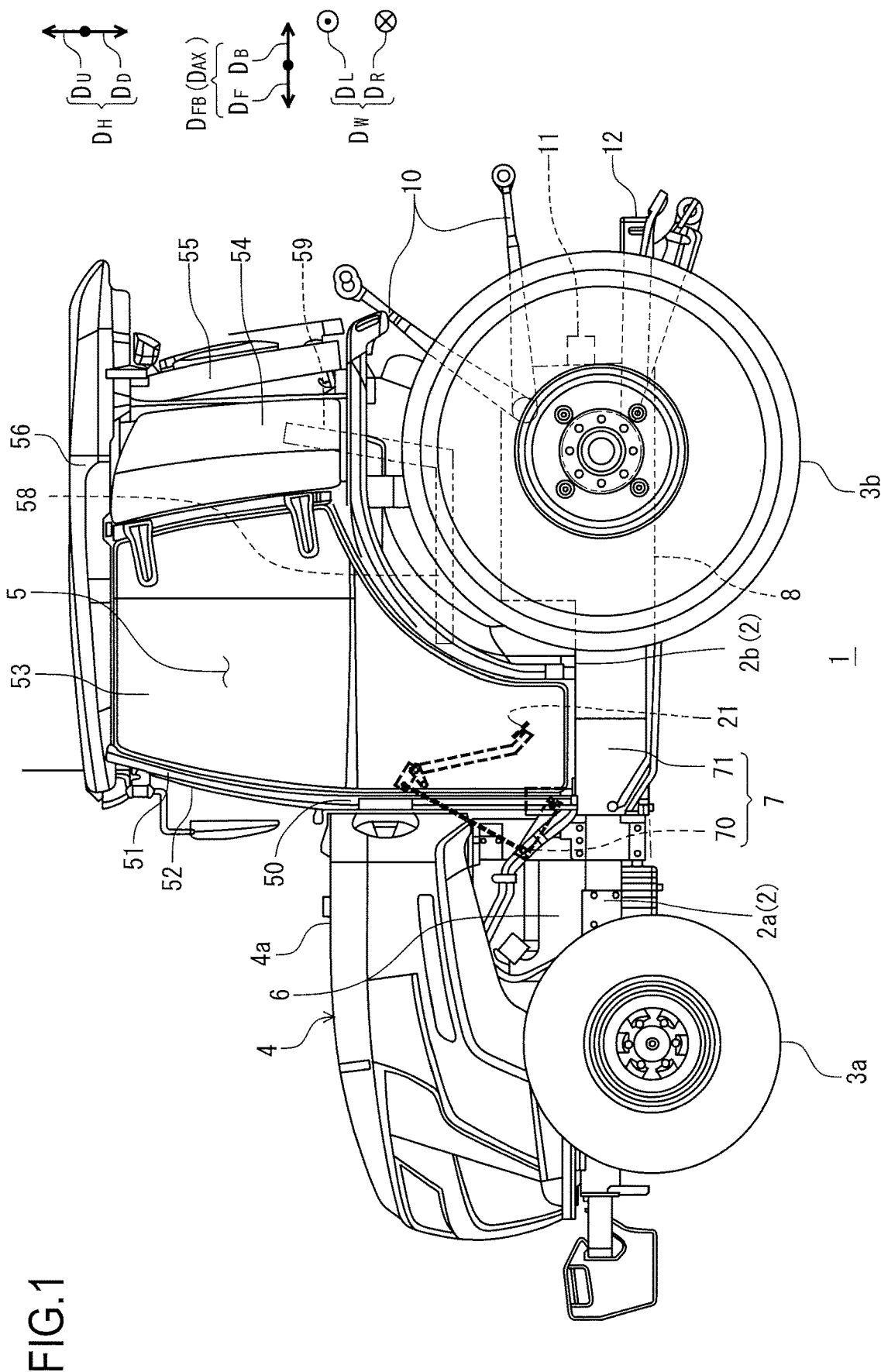
FIG. 1 is a side view of a work vehicle according to an embodiment.

An embodiment will now be described hereinafter with reference to the drawings. Same reference signs denote corresponding or identical configurations in the drawings.

First Embodiment

<Entire Configuration>

FIG. 1 is a side view of a work vehicle 1 according to the embodiment. Examples of the work vehicle 1 include an agricultural tractor. The work vehicle 1 includes a vehicle body frame 2, traveling wheels 3a and 3b, an engine compartment 4, and a cabin 5. The work vehicle 1 is preferably a four-wheel drive vehicle configured to rotary drive the four traveling wheels 3a and 3b to travel.

The embodiment in the present application refers to a forward direction $D_F$ and a backward direction $D_B$ respectively indicating a forward direction and a backward direction viewed from an operator seated on a seat 58 provided in the cabin 5. An anteroposterior direction $D_{FB}$ has a concept generally indicating the forward direction $D_F$ and the backward direction $D_B$. A leftward direction $D_L$, a rightward direction $D_R$, and a lateral direction $D_W$ indicate a leftward direction, a rightward direction, and a lateral direction viewed from the operator, respectively. An upward direction $D_U$ and a downward direction $D_D$ indicate an upward direction and a downward direction viewed from the operator, respectively. A height direction $D_B$ has a concept generally indicating the upward direction $D_U$ and the downward direction $D_D$. Assume that anteroposterior, transverse (lateral), and height directions of the work vehicle 1 match anteroposterior, transverse (lateral), and height directions viewed from the operator, respectively.

The vehicle body frame 2 includes a front frame 2a and a rear frame 2b. The front frame 2a is provided with the engine compartment 4. The engine compartment 4 is defined by a cover 4a. The cover 4a covers at least part of an engine 6 and various devices, which are connected to the engine 6 and will be described later. The engine 6 is supported by the front frame 2a. The engine 6 is preferably a water-cooled vertical diesel engine including a common rail system (not depicted).

The work vehicle 1 includes a clutch 7. The clutch 7 is connected to the engine 6. The engine 6 has rotary motive power transmittable to a gearbox provided in a transmission case 8 via the clutch 7. The clutch 7 includes a clutch housing 70 and a clutch lever 71 swingably provided at the clutch housing 70. The clutch housing 70 is supported by the front frame 2a via the engine 6.

The rear frame 2b is provided with the cabin 5 and the transmission case 8. The transmission case 8 accommodates a travel gearbox configured to transmit drive power transmitted from the engine 6 via the clutch 7 to the traveling wheels 3a and 3b, and the like. The transmission case 8 further accommodates a work device gearbox configured to distribute motive power from the engine 6 to a work device (not depicted) separately from the traveling wheels 3a and 3b, the clutch, and the like. The work device gearbox, the clutch, and the like constitute a motive power transmission system to be called a work transmission system.

The work vehicle 1 further includes a pair of lift arms 10, a PTO shaft 11, and a traction device 12. The lift arms 10 are provided on right and left sides of the work vehicle 1 one by one. The lift arms 10 are each vertically swingable in accordance with operation of a hydraulic lift cylinder included in the work transmission system. The PTO shaft 11 functions as an output shaft for motive power of the work transmission system. The pair of lift arms 10 is coupled to a link mechanism (not depicted), and the PTO shaft 11 is connected to a transmission shaft for transmission of motive power to a work device (not depicted) like a rotary tillage device coupled to the link mechanism. The traction device 12 couples a convey carrier (not depicted) to a rear end of the work vehicle 1 for conveyance.

<Cabin Internal Configuration>

The cabin 5 is a space surrounded with a front wall 50, a cabin frame 51, a windshield 52, door panels 53, side windows 54, a rear window 55, and a roof 56. The cabin frame 51 supports the windshield 52, the door panels 53, the side windows 54, the rear window 55, and the roof 56. The cabin 5 includes the front wall 50 provided below the windshield 52 and interposed by the cabin frame 51. The front wall 50 serves as a partition wall provided between the cabin 5 and the engine compartment 4. The roof 56 has a storage space accommodating an air conditioner, a wireless communication device, and the like.

Figure 2:
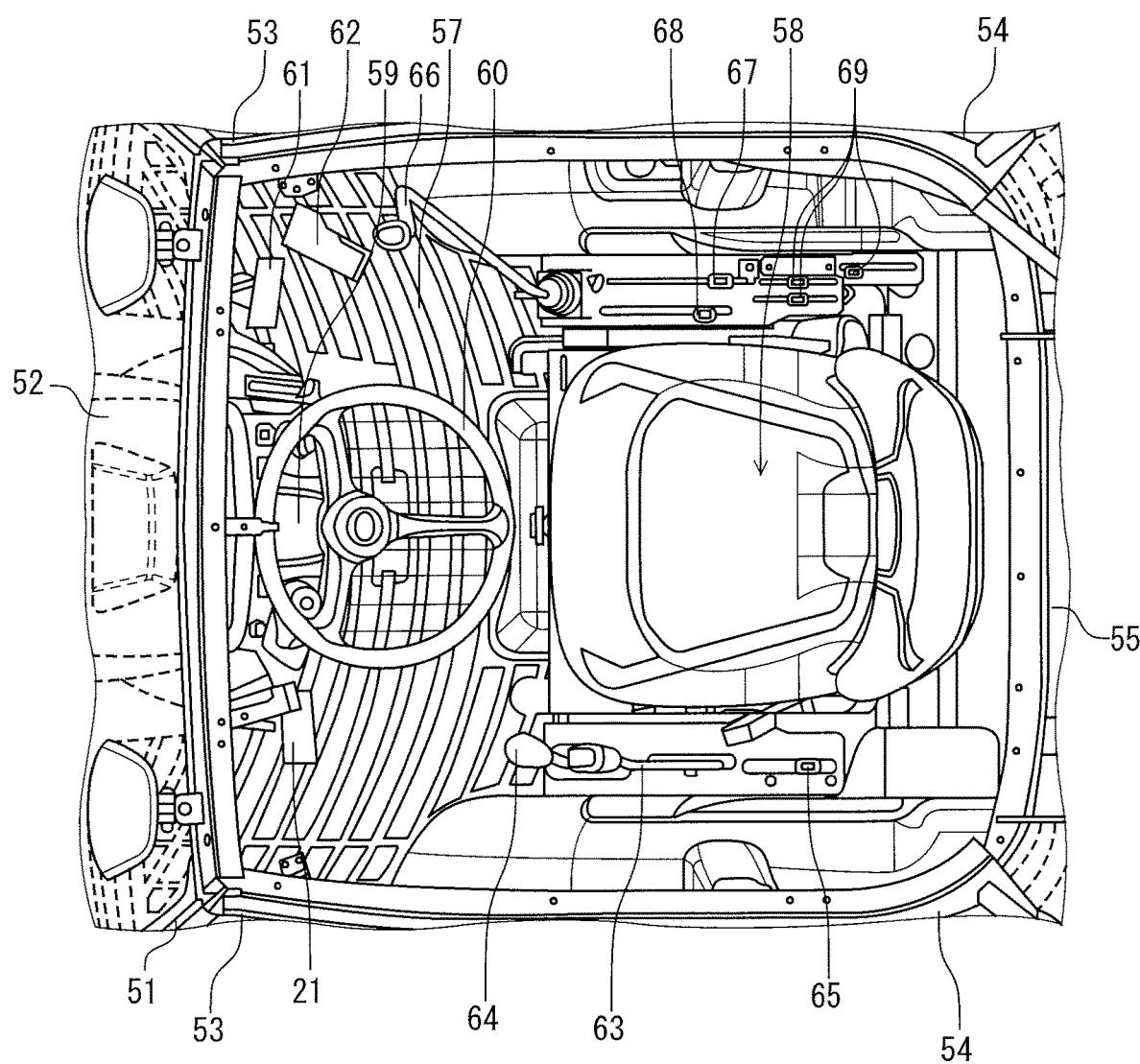
FIG. 2 is a plan view of a cabin in the work vehicle.
Figure 2:
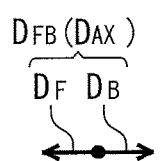
Figure 2:
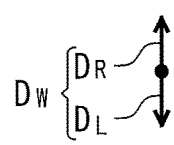

FIG. 2 is a plan view of an interior of the cabin 5 excluding the roof 56. The work vehicle 1 includes a floor panel 57 and the seat 58, which are provided in the cabin 5. The floor panel 57 constitutes a floor surface of the cabin 5. The floor panel 57 is provided therebehind with the seat 58. The windshield 52 is transparent and constitutes a front end of the cabin 5. The door panels 53 are transparent and are provided at right and left ends of the cabin 5. The door panels 53 are outwardly openable. A state of being outwardly openable indicates a state of being openable to be distant from the floor panel 57 and the seat 58. The side windows 54 are transparent and are provided at the right and left ends of the cabin 5 and behind the door panels 53. The side windows 54 are also outwardly openable. The rear window 55 is transparent and constitutes a rear end of the cabin 5. The rear window 55 is also outwardly openable. As depicted in FIG. 2, the work vehicle 1 further includes a display 59, a steering wheel 60, a clutch pedal 21, a brake pedal 61, a speed control pedal 62, and the like, which are provided behind the windshield 52 and ahead of the seat 58.

The work vehicle 1 includes a first operation lever 63, a second operation lever 64, and a third operation lever 65, which are provided on the left of the seat 58 in the cabin 5. The first operation lever 63 is preferably configured as a shuttle shift lever. The first operation lever 63 is swingable in the anteroposterior direction $D_{FB}$. The first operation lever 63 tilted forward causes the work vehicle 1 to travel forward. The first operation lever 63 tilted backward causes the work vehicle 1 to travel backward.

The second operation lever 64 is preferably configured to set whether or not to drive front wheels (the traveling wheels 3a). The second operation lever 64 is provided ahead of the first operation lever 63. The second operation lever 64 is swingable in the anteroposterior direction $D_{FB}$. The second operation lever 64 tilted forward may cause the front wheels 3a to be driven so as to achieve four-wheel drive travel of the work vehicle 1 ("4WD ON"). The second operation lever 64 tilted backward may cause only rear wheels 3b to be driven so as to achieve two-wheel drive travel of the work vehicle 1 ("4WD OFF"). The second operation lever 64 may alternatively be configured to turn OFF four-wheel drive when being tilted forward and turn ON four-wheel drive when being tilted backward.

The third operation lever 65 is configured as a gear shift lever. The third operation lever 65 preferably has three gear levels of LOW, MIDDLE, and HIGH, which are selected for low-speed travel, middle-speed travel, and high-speed travel, respectively. The third operation lever 65 is slidable in the anteroposterior direction $D_{FB}$. The third operation lever 65 may be slid forward to set the gear level to LOW. The third operation lever 65 may be slid to the middle to set the gear level to MIDDLE. The third operation lever 65 may be slid backward to set the gear level to HIGH. The third operation lever 65 may alternatively be configured to set the gear level to HIGH when slid forward and set the gear level to LOW when slid backward. The second and third operation levers 64 and 65 are mechanically connected to the travel gearbox and the like accommodated in the transmission case 8. Each of the second and third operation levers 64 and 65 may alternatively be electrically connected, via a switch or the like, to the travel gearbox and the like accommodated in the transmission case 8.

The work vehicle 1 includes a fourth operation lever 66, a fifth operation lever 67, a sixth operation lever 68, and seventh operation levers 69, which are provided on the right of the seat 58 in the cabin 5. The fourth operation lever 66 is relevant to the work transmission system (output of the PTO shaft 11). The fifth operation lever 67 is configured to vertically shift the work device (not depicted). The fifth operation lever 67 is swingable in the anteroposterior direction $D_{FB}$. The fifth operation lever 67 tilted backward may cause the lift arms 10 to shift the work device upward. The fifth operation lever 67 tilted forward may cause the lift arms 10 to shift the work device downward. Alternatively, the fifth operation lever 67 tilted backward may cause the lift arms 10 to shift the work device downward, and the fifth operation lever 67 tilted forward may cause the lift arms 10 to shift the work device upward.

The sixth operation lever 68 is configured to set to control the lift arms 10 to shift the work device vertically in accordance with unevenness or hardness of soil (cause the work device to follow change of a soil state) for achievement of constant tractive force of the work device as much as possible, or to set to control the lift arms 10 so as not to cause the work device to follow such change of the soil state. The sixth operation lever 68 is swingable in the anteroposterior direction $D_{FB}$. When the sixth operation lever 68 is tilted backward, the work vehicle 1 may control the lift arms 10 to cause the work device to follow change of the soil state. When the sixth operation lever 68 is tilted forward, the work vehicle 1 may control the lift arms 10 not to cause the work device to follow change of the soil state. The work vehicle 1 may also be configured to control the lift arms 10 to float the work device above soil. When the sixth operation lever 68 is further tilted forward from a position for not causing the work device to follow change of the soil state, the work vehicle 1 may control the lift arms 10 to float the work device above soil. The seventh operation levers 69 include levers configured to directly control the lift cylinders of the lift arms 10.

<Entire Configurations of Clutch and Clutch Operation Device>

Figure 3:
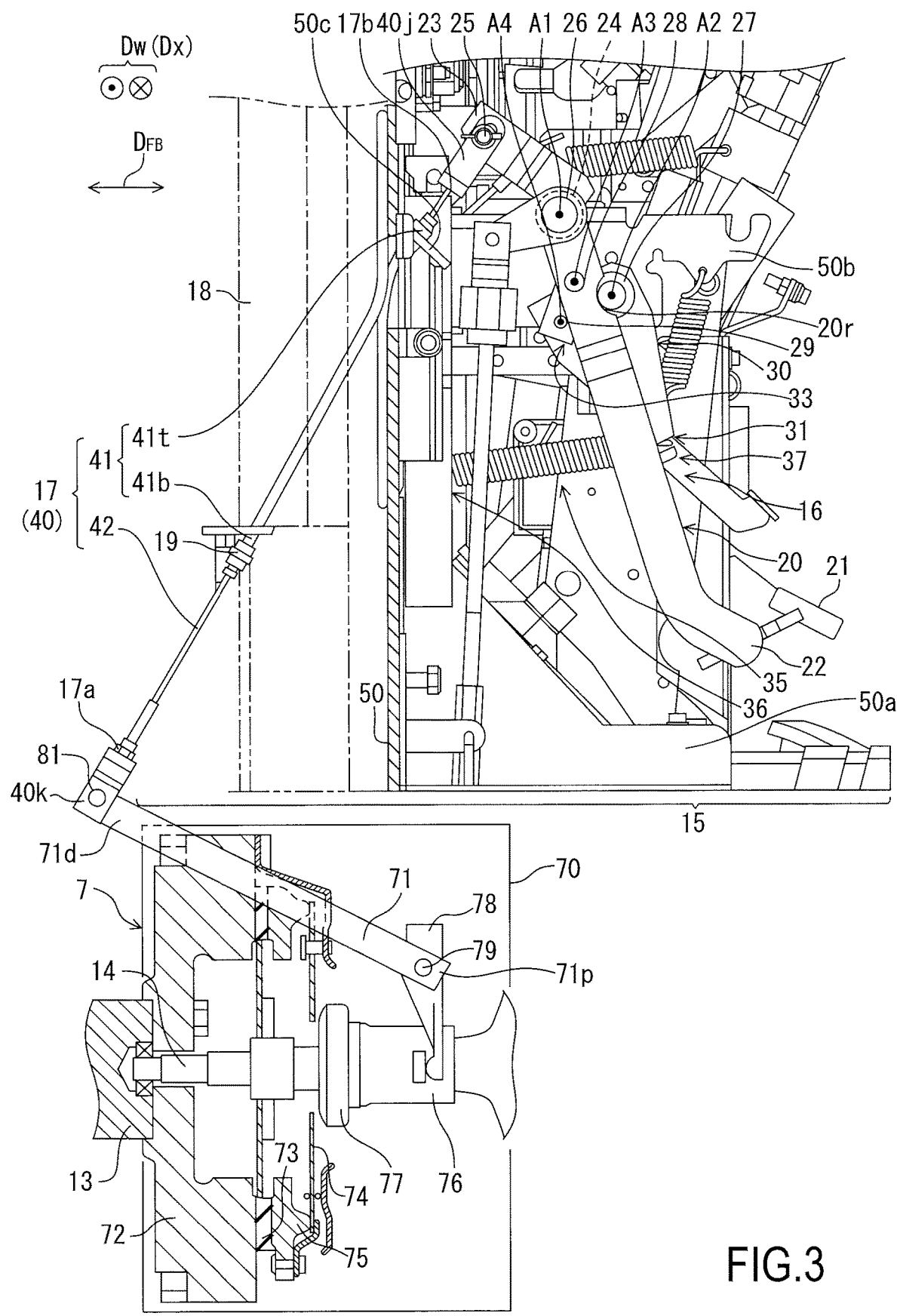
FIG. 3 is an entire configuration diagram of a clutch and a clutch operation device.

FIG. 3 is an entire configuration diagram of the clutch 7 and a clutch operation device 15 including the clutch pedal 21. The work vehicle 1 includes the clutch operation device 15. The clutch operation device 15 includes a link mechanism 16 including the clutch pedal 21, and a clutch operation mechanism 17 configured to transmit tread force from the link mechanism 16 to the clutch lever 71.

The link mechanism 16 includes a pedal component 20 and a first shaft 26. The first shaft 26 is supported by the front wall 50 and has a first rotary axis A1. More specifically, the front wall 50 includes a bulge 50a bulging backward, and a support plate 50b fixed to the bulge 50a, and the first shaft 26 is attached to the support plate 50b so as to protrude from the support plate 50b. The first rotary axis A1 extends along the lateral direction $D_W$ of the work vehicle. In the present embodiment, the first shaft 26 may simply be called a shaft 26 and the first rotary axis A1 may simply be called a center axis A1. The pedal component 20 is supported by the first shaft 26 so as to be swingable about the first rotary axis A1. More specifically, the pedal component 20 includes a boss 24 penetrated by the first shaft 26, and the boss 24 is supported by the first shaft 26. The pedal component 20 has a third end 22 and a fourth end 23 positioned opposite to the third end 22 with respect to the first shaft 26. The third end 22 is provided with the clutch pedal 21.

The clutch operation mechanism 17 has a first end 17a connected to the clutch lever 71 and a second end 17b positioned opposite to the first end. The fourth end 23 of the pedal component 20 is connected to the second end 17b of the clutch operation mechanism 17. The clutch operation mechanism 17 according to the present embodiment is configured as a control cable 40. The work vehicle 1 thus includes the control cable 40. The control cable 40 has flexibility.

The control cable 40 includes an outer tube 41 and an inner cable 42 slidably inserted to the outer tube 41. The outer tube 41 has a lower end 41b supported, via a support stay 19, by a pillar 18 that is supported by the front frame 2a. The support stay 19 is connected to the clutch housing 70 via the pillar 18, the front frame 2a, and the engine 6. The outer tube 41 has an upper end 41t supported by the front wall 50 via a support stay 50c attached to the front wall 50. Accordingly, the first longitudinal end 41t of the outer tube 41 is connected to the cabin 5, and the second longitudinal end 41b of the outer tube 41 is connected to the clutch housing 70.

The inner cable 42 has the first end 17a and the second end 17b. The first end 17a is provided with a U-shaped joint 40j and is attached to a distal end portion 71d of the clutch lever 71 via a pin 81. The second end 17b is provided with a U-shaped joint 40k that is attached to the fourth end 23 of the pedal component 20 via a pin 25. Accordingly, the second longitudinal end 17b of the inner cable 42 is connected to the clutch pedal 21 whereas the first longitudinal end 17a of the inner cable 42 is connected to the clutch lever 71.

The clutch 7 includes, in addition to the clutch housing 70 and the clutch lever 71, a flywheel 72, a clutch disc 73, a diaphragm spring 74, a pressure plate 75, a release bearing sleeve 76, a release bearing 77, and a release fork 78. The flywheel 72 is connected to an output shaft 13 of the engine 6. The clutch disc 73 is connected to a main shaft 14 of the gearbox in the transmission case 8. When the clutch 7 is connected, the diaphragm spring 74 presses, to the flywheel 72, the clutch disc 73 attached onto the main shaft 14 via the pressure plate 75. This achieves connection between the output shaft 13 of the engine 6 and the main shaft 14.

Figure 9:
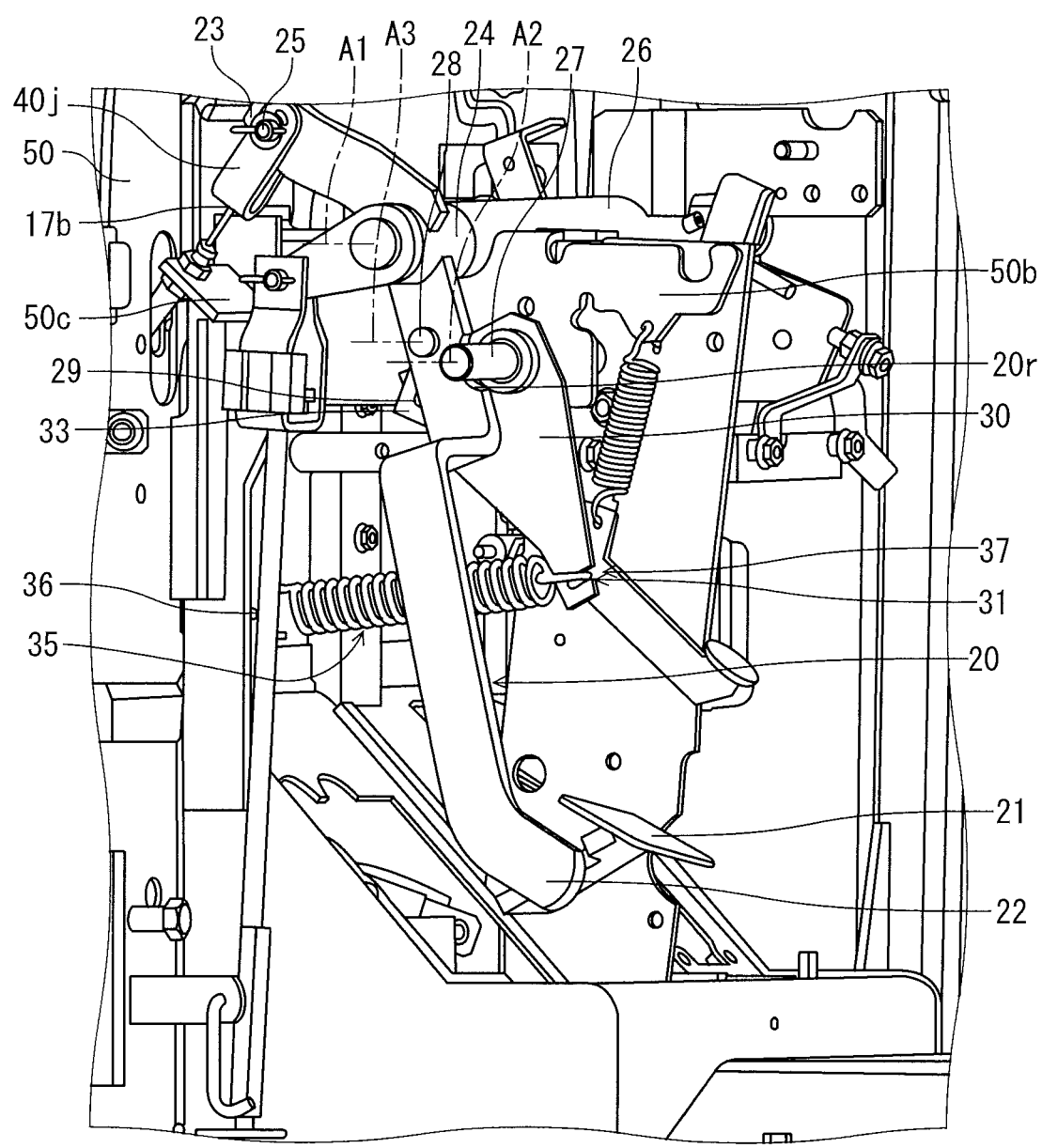
FIG. 9 is a perspective view of the link mechanism including a clutch pedal receiving no external force.

The release bearing sleeve 76 is slidably supported by the main shaft 14. When the clutch 7 is disconnected, the release bearing sleeve 76 shifts toward the diaphragm spring 74 and the release bearing sleeve 76 presses the release bearing 77 to the diaphragm spring 74. This causes the diaphragm spring 74 to warp and causes the clutch disc 73 to be separated from the flywheel 72, so that the output shaft 13 of the engine 6 is disconnected from the main shaft 14. The release fork 78 is attached to a lever shaft 79 that is attached to a proximal end portion 71p opposite to the distal end portion 71d of the clutch lever 71. The release fork 78 is rotatable integrally with the clutch lever 71 about an axial center of the lever shaft 79 relatively to the clutch housing 70. When the clutch pedal 21 is pressed forward from a state where the clutch is connected as depicted in FIGS. 3 and 9, the fourth end 23 of the pedal component 20 is rotated upward and the inner cable 42 pulls the distal end portion 71d of the clutch lever 71 (see FIG. 10). The lever shaft 79 is then rotated and the release fork 78 rotates about the lever shaft 79 such that a tip end of the release fork 78 shifts toward the diaphragm spring 74. The release bearing sleeve 76 accordingly shifts toward the diaphragm spring 74 to disconnect the clutch 7.

When the clutch pedal 21 is released from tread force, the diaphragm spring 74 returns the release bearing sleeve 76 to an original position, and the release fork 78, the clutch lever 71, and the clutch pedal 21 are also returned to original positions. The work vehicle 1 thus includes a first elastic member (the diaphragm spring 74) to bias the clutch operation mechanism 17 such that the fourth end 23 of the pedal component 20 is shifted toward the clutch 7. In this manner, the clutch lever 71 swings to disconnect and connect the clutch 7.

<Routing of Control Cable>

Figure 4:
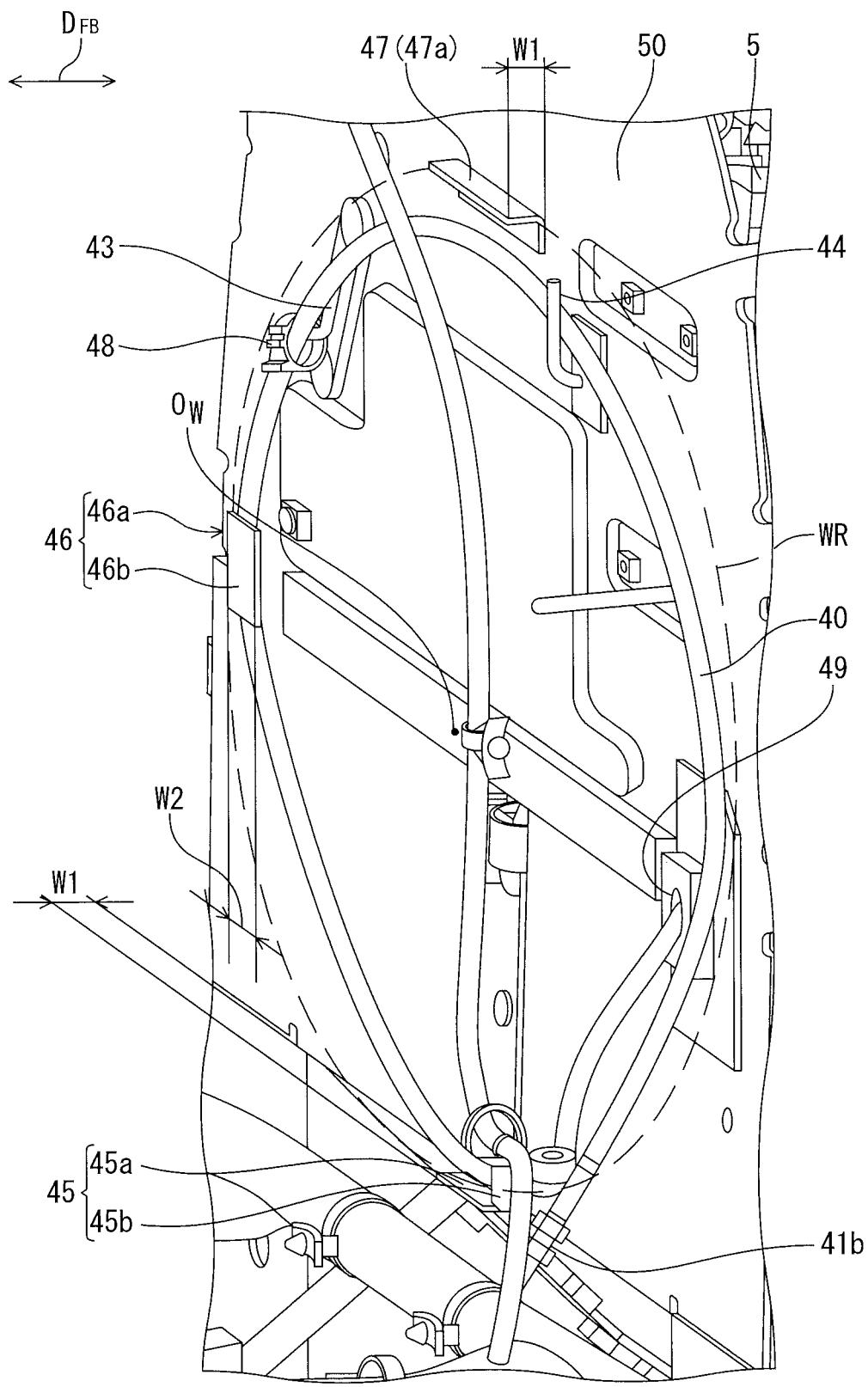
FIG. 4 is a view depicting routing of a control cable.

The control cable 40 according to the present embodiment will be described next in terms of its routing. As depicted in FIG. 4, the control cable 40 is wound on the partition wall 50 of the cabin 5. Even in a case where the cabin 5 vibrates to cause change in relative position between the cabin 5 and the clutch 7 (the clutch housing 70), such change in relative position is absorbed by bending of the control cable 40 being wound so that neither the positional relation between the lower end 41b of the outer tube 41 and the first end 17a of the inner cable 42 nor the positional relation between the upper end 41t of the outer tube 41 and the second end 17b of the inner cable 42 is affected by vibration of the cabin 5 relative to the clutch 7, but these positional relations are affected only by vibration of the pedal component 20 caused by pressing the clutch pedal 21. This configuration inhibits disconnection and connection of the clutch 7 unintended by the operator riding the clutch. The user can thus easily operate the clutch pedal 21.

With reference to FIG. 4, the work vehicle 1 includes at least one of latch members 43 and 44 and at least one of retain members 45 to 47. Any one of the latch members 43 and 44 may be excluded, and at least one of the retain members 45 to 47 may be entirely excluded. At least one of the latch members 43 and 44 latches the control cable 40 onto the partition wall 50 of the cabin 5. At least one of the retain members 45 to 47 restricts the control cable 40 from swelling within a winding region WR of the partition wall 50.

Figure 5:
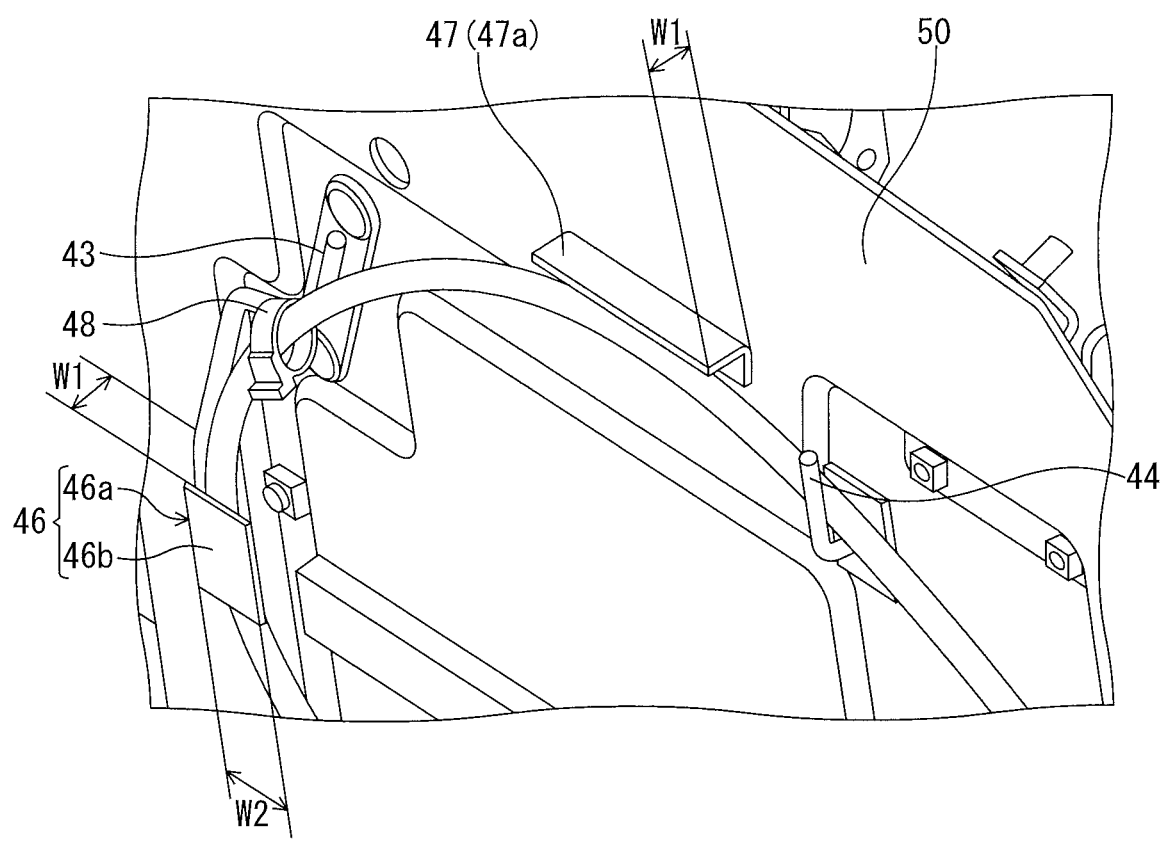
FIG. 5 is an enlarged top view of a winding region of the control cable.
Figure 6:
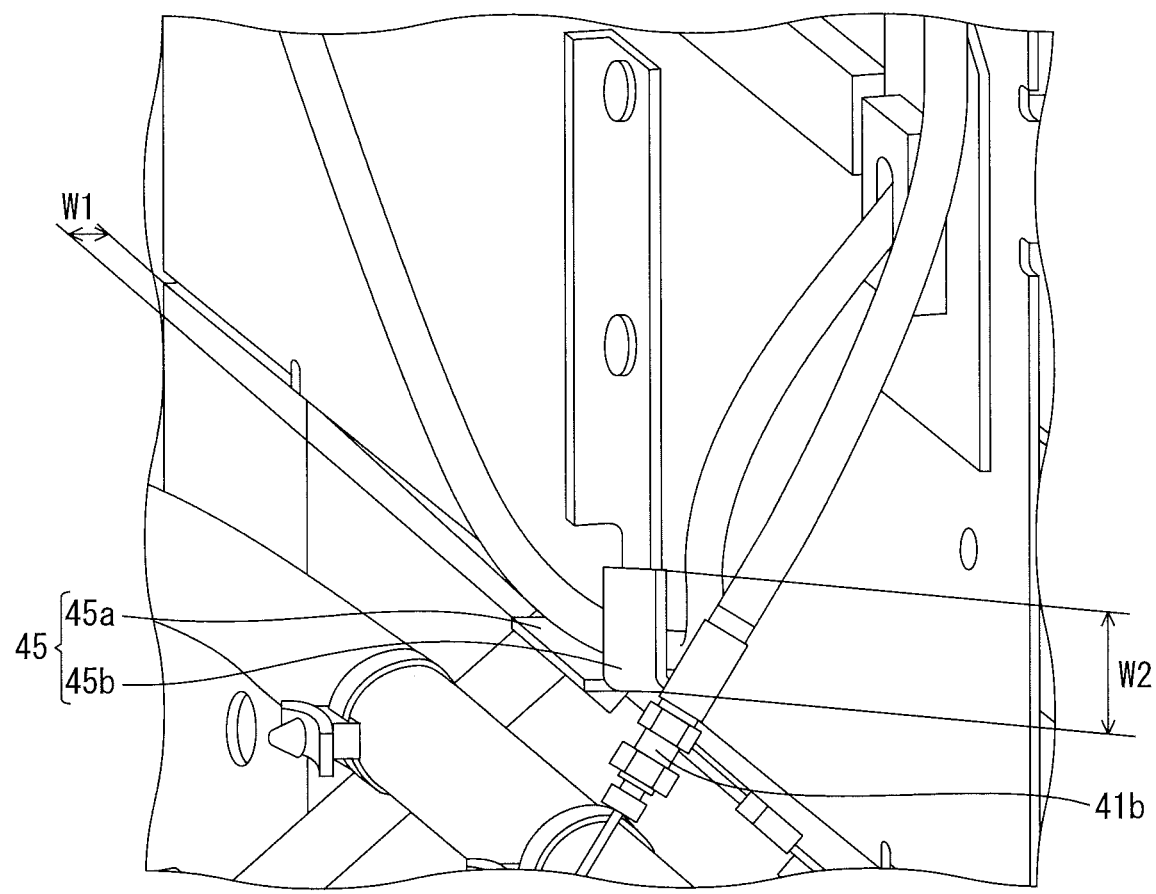
FIG. 6 is an enlarged bottom view of the winding region of the control cable.

With reference to FIGS. 4 to 6, at least one of the retain members 45 to 47 defines at least part of an outer periphery of the winding region WR, and includes an outer periphery regulating plate 45a, 46a, or 47a extending from the partition wall 50 of the cabin 5. The outer periphery regulating plate 45a, 46a, or 47a extends in the anteroposterior direction $D_{FB}$ from the partition wall 50 of the cabin 5. This configuration restricts the control cable 40 from swelling outside the winding region WR. At least one of the retain members 45 and 46 further includes a front regulating plate 45b or 46b that is connected to the outer periphery regulating plate 45a or 46a and extends substantially in parallel with the partition wall 50 of the cabin 5 from the outer periphery regulating plate 45a or 46a toward a center Ow of the winding region WR. The outer periphery regulating plate 45a or 46a has a length W1 in the anteroposterior direction $D_{FB}$ and a radial length W2 with respect to the center Ow of the front regulating plate 45b or 46b, and the length W2 is larger than the length W1. At least one of the latch members 43 and 44 and at least one of the retain members 45 to 47 inhibit shift of the control cable 40 to an inappropriate position in the engine compartment 4 while the work vehicle 1 is in operation.

The retain member 45 or 46 provided at a lower position in at least one of the retain members 45 to 47 is desired to include the front regulating plate 45b or 46b. The partition wall 50 is provided thereabove with at least one of the latch members 43 and 44 in order to wind the control cable 40. The retain member 45 or 46 provided at the lower position and including the front regulating plate 45b or 46b inhibits inappropriate shift in the anteroposterior direction $D_{FB}$ of the control cable 40.

The work vehicle 1 preferably further includes a clamp 48 latched to the latch member 43 as at least one of the latch members 43 and 44 and wound around the control cable 40. This configuration achieves further inhibition of shift of the control cable 40 to an inappropriate position in the engine compartment 4. The control cable 40 runs from the support stay 50c at the front wall (partition wall) 50, passes an opening 49 provided in the front wall (partition wall) 50, the retain member 45 or 46, the clamp 48, near the retain member 47, and the latch member 44 in the mentioned order to reach the support stay 19. FIGS. 4 and 6 exclude the pillar 18 supported by the front frame 2a and the support stay 19, in order to clearly depict routing of the control cable 40.

<Details of Link Mechanism>

The link mechanism 16 according to the present embodiment will be described next in terms of its detailed structure. With reference to FIGS. 3 and 7 to 11, the link mechanism 16 includes, in addition to the pedal component 20 and the first shaft 26 described earlier, a second shaft 27, a first pin 28, a second pin 29, a first link 30, a second link 33, and a second elastic member 35. The second shaft 27 is supported by the front wall 50 and has a second rotary axis A2 substantially in parallel with the first rotary axis A1. The second shaft 27 is also attached to the support plate 50b so as to protrude from the support plate 50b. The first shaft 26 is positioned between the front wall 50 and the second shaft 27 in a direction (the anteroposterior direction $D_{FB}$) perpendicular to the front wall 50 of the cabin 5.

The first pin 28 is provided at the pedal component 20 between the first shaft 26 and the third end 22 of the pedal component 20, and has a third rotary axis A3 substantially in parallel with the first rotary axis A1. The first link 30 is supported by the second shaft 27 so as to be swingable about the second rotary axis A2, and has a connection end 31. The second pin 29 is provided at the first link 30 and has a fourth rotary axis A4 substantially in parallel with the second rotary axis A2. The second link 33 is rotatably coupled to the first pin 28 and the second pin 29.

The second elastic member 35 has a fifth end 36 connected to the front wall 50 and a sixth end 37 positioned opposite to the fifth end 36 and connected to the connection end 31 of the first link 30, and swings the connection end 31 about the second rotary axis A2 to bias the connection end 31 toward the front wall 50. The second elastic member 35 is thus configured as a tension spring. In the case where the clutch operation mechanism 17 is configured as the control cable 40 wound on the partition wall 50 of the cabin 5 as described above, the inner cable 42 in the outer tube 41 has a longer sliding distance with larger sliding friction. The second elastic member 35 is to bias the connection end 31 toward the front wall 50 to assist in pressing the clutch pedal 21 and achieve improvement in operability of the clutch pedal 21. The link mechanism 16 will be described below in terms of specific features achieving such improvement.

Figure 7:
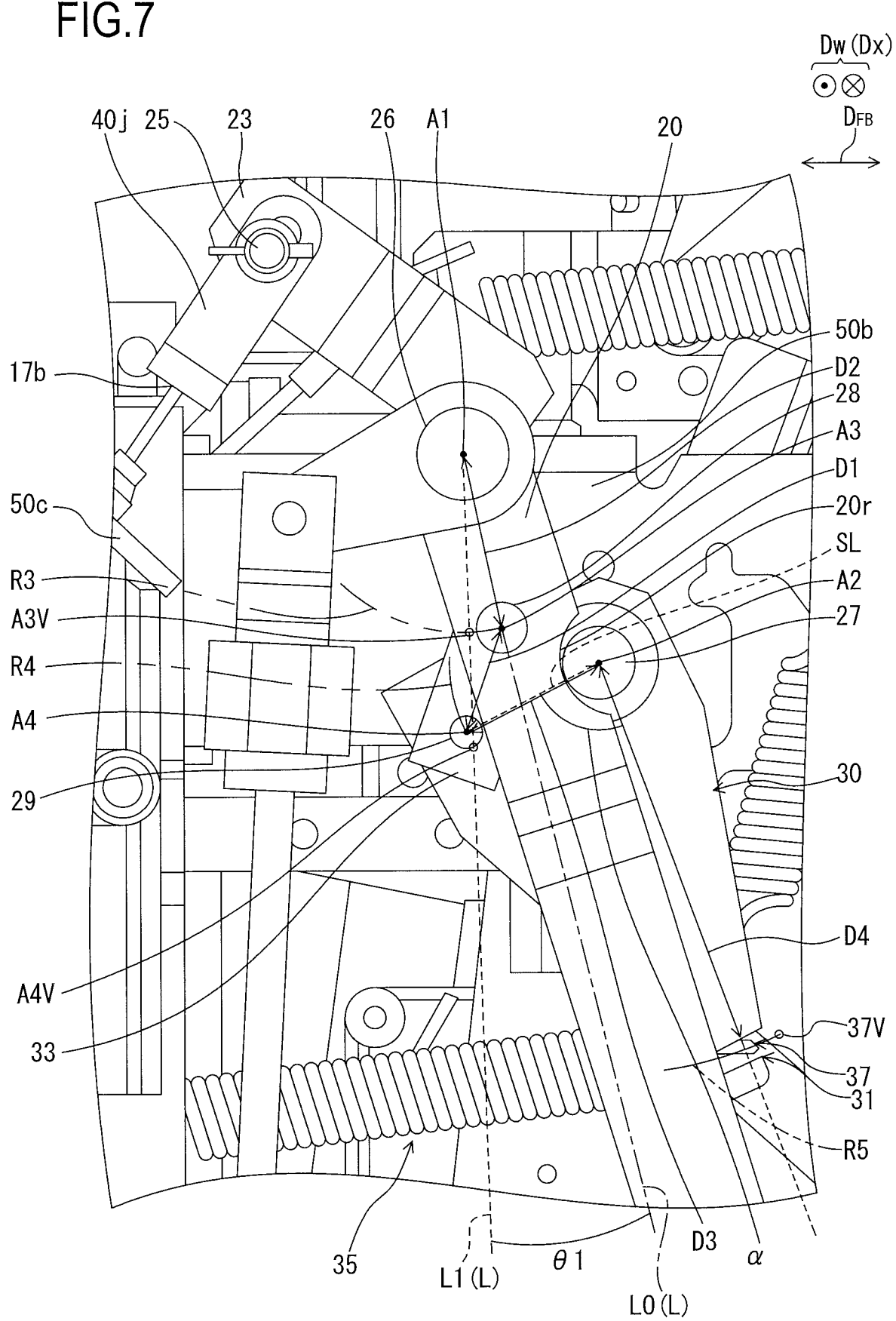
FIG. 7 is an enlarged view of a link portion of a link mechanism.
Figure 8:
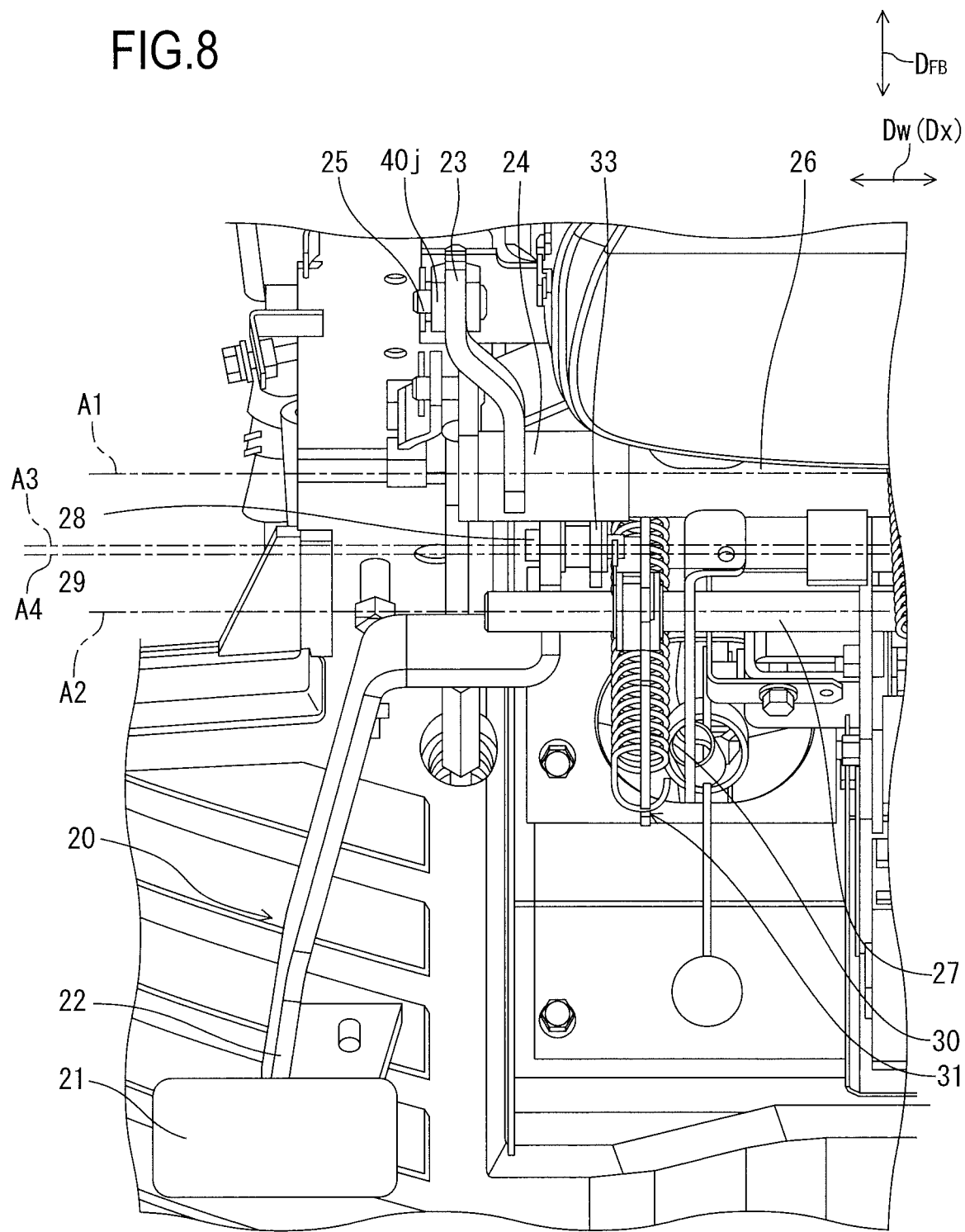
FIG. 8 is a top perspective view of the link mechanism.

With reference to FIG. 7, in a nonoperation state where no external force is applied to the clutch pedal 21, a first straight line L0 passing the first rotary axis A1 and the third rotary axis A3 crosses a line segment SL connecting the second rotary axis A2 and the fourth rotary axis A4 when viewed in an axial direction Dx along the first rotary axis A1. The axial direction Dx extends along the second rotary axis A2, the third rotary axis A3, and the fourth rotary axis A4. When viewed in the axial direction Dx, the fourth rotary axis A4 and the third rotary axis A3 have a first distance D1 shorter than a second distance D2 between the third rotary axis A3 and the first rotary axis A1. The first distance D1 shorter than the second distance D2 allows large movement of the fourth rotary axis A4 relative to movement of the clutch pedal 21, so as to achieve more effective assistance by the second elastic member 35.

When viewed in the axial direction Dx, the first distance D1 is shorter than a third distance D3 between the fourth rotary axis A4 and the second rotary axis A2. The first distance D1 shorter than the third distance D3 does not allow large rotation of the connection end 31 relative to movement of the second link 33, so that the second elastic member 35 can be easily fixed. When viewed in the axial direction Dx, the third distance D3 is shorter than a fourth distance D4 between the fourth rotary axis A4 and the connection end 31. This configuration allows larger movement of the connection end 31 in comparison to the second pin 29, to enhance bias force of the second elastic member 35.

When viewed in the axial direction Dx, an angle α made by a line segment extending from the second rotary axis A2 to the fourth rotary axis A4 and a line segment extending from the second rotary axis A2 to the connection end 31 is less than 90 degrees. The second elastic member 35 can thus be reduced in length to prevent the first link 30 from protruding backward from the display 59 (FIG. 2)

Figure 10:
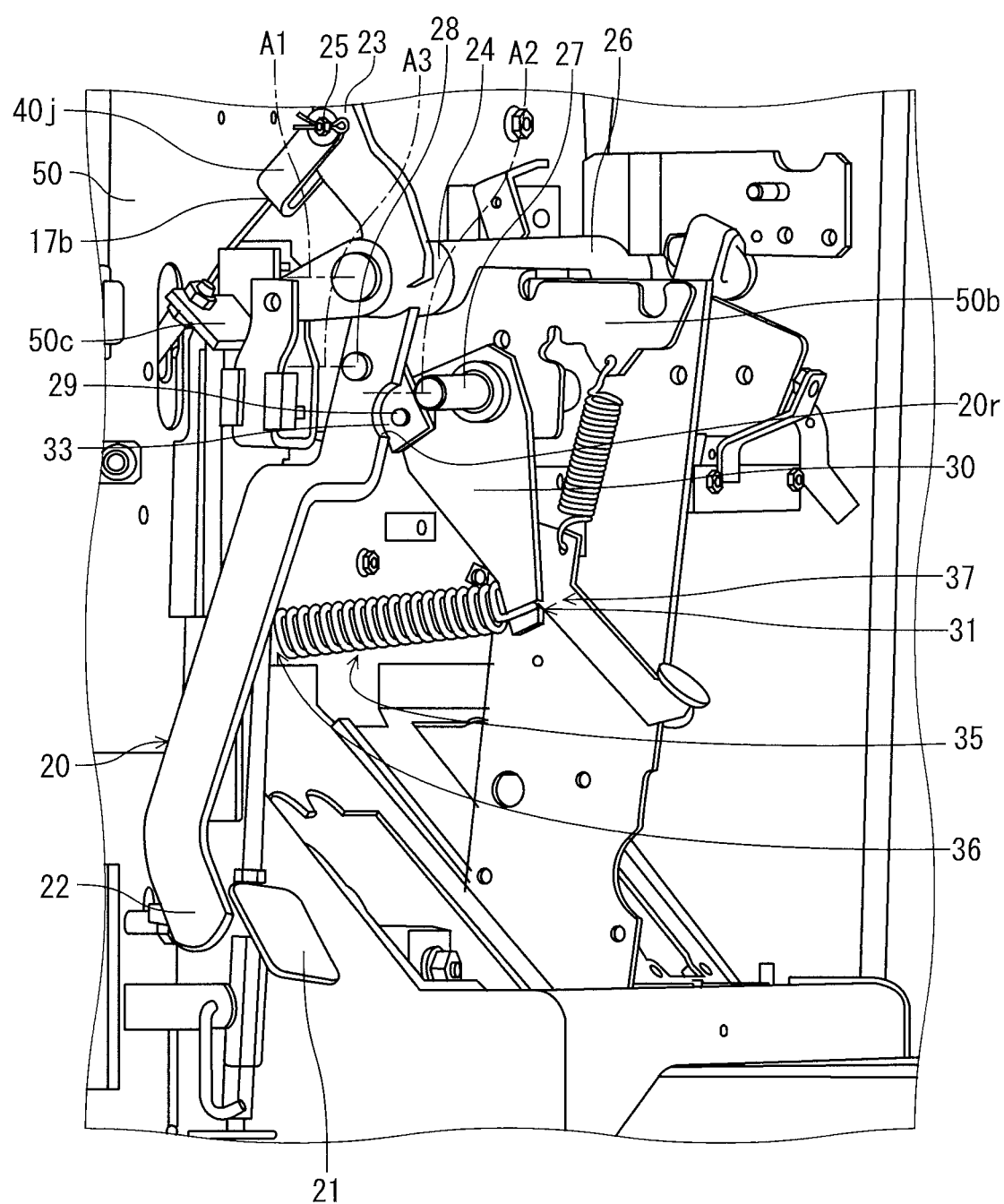
FIG. 10 is a perspective view of the link mechanism including the clutch pedal receiving external force.
Figure 11:
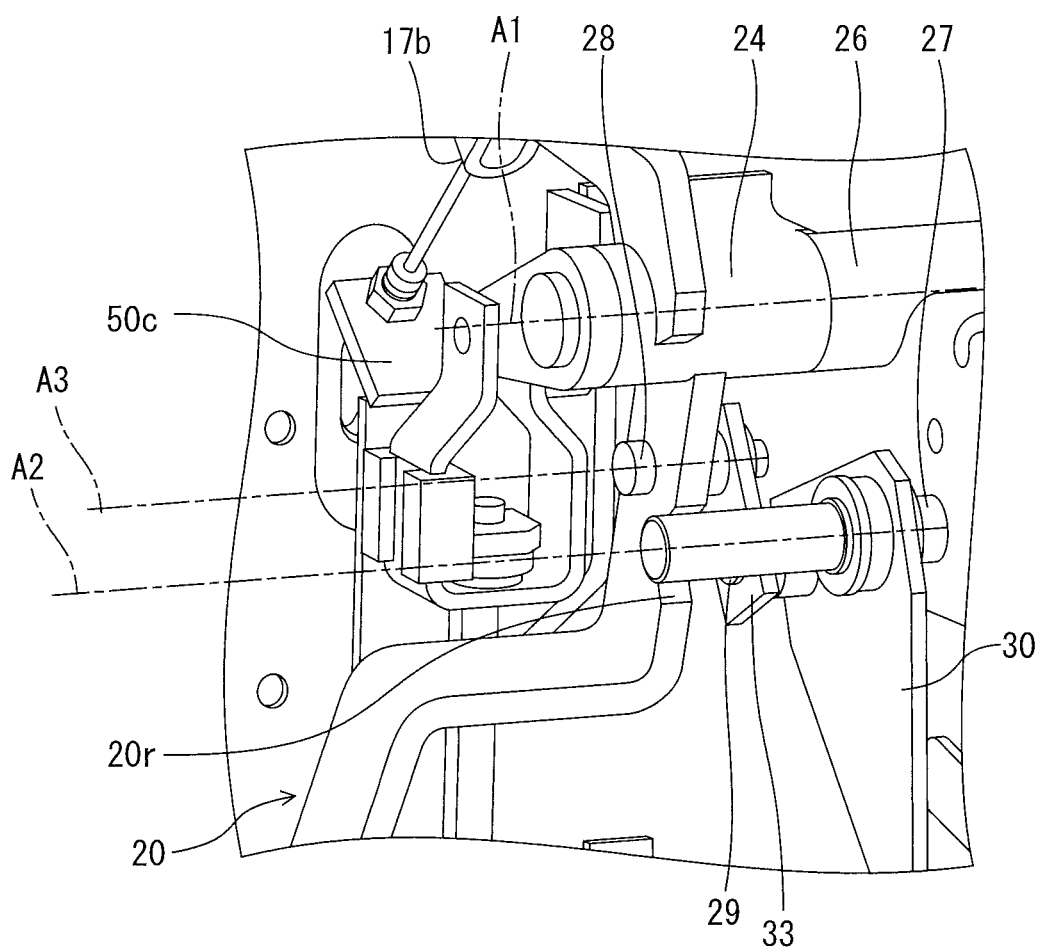
FIG. 11 is an enlarged perspective view of the link portion of the link mechanism including the clutch pedal receiving external force.

A first straight line L passing the first rotary axis A1 and the third rotary axis A3 rotates clockwise from a reference straight line L0 as the first straight line L in the nonoperation state, when viewed from a side (left) of a sheet of FIG. 7 due to external force applied to the clutch pedal 21. FIG. 7 includes a locus R3 of an axial center of the third rotary axis A3, a locus R4 of an axial center of the fourth rotary axis A4, and a locus R5 of the sixth end 37 of the second elastic member 35 (a locus of the connection end 31). The axial center of the third rotary axis A3 shifts forward as external force is applied to the clutch pedal 21. The axial center of the fourth rotary axis A4 shifts counterclockwise when viewed from the side (left) of the sheet of FIG. 7 until the first rotary axis A1, the third rotary axis A3, and the fourth rotary axis A4 are aligned on a single straight line L1 when viewed in the axial direction Dx (FIG. 7 indicates a position A3V of the third rotary axis A3 and a position A4V of the fourth rotary axis A4 when the first, third, and fourth rotary axes are aligned on the single straight line L1), and then shifts clockwise (upward) when viewed from the side (left) of the sheet of FIG. 7. In correspondence with shift of the axial center of the fourth rotary axis A4, the sixth end 37 of the second elastic member 35 shifts counterclockwise when viewed from the side (left) of the sheet of FIG. 7 until the first rotary axis A1, the third rotary axis A3, and the fourth rotary axis A4 are aligned on the single straight line L1 when viewed in the axial direction Dx (FIG. 7 indicates a position 37V of the sixth end 37 when the first, third, and fourth rotary axes are aligned on the single straight line L1), and then shifts clockwise (forward) when viewed from the side (left) of the sheet of FIG. 7. Assuming that the reference straight line L0 and the straight line L1 form a first angle θ1, the link mechanism 16 is configured such that the connection end 31 of the first link 30 shifts toward the front wall 50 when viewed in the axial direction Dx as a rotation angle made by the reference straight line L0 as the first straight line L in the nonoperation state and the first straight line passing the third rotary axis A3 shifted due to application of external force to the clutch pedal 21 becomes larger than the first angle θ1. FIG. 10 depicts the pedal component 20 in a case where the clutch pedal 21 is pressed maximally. When the rotation angle becomes larger than the first angle θ1, the second elastic member 35 can thus assist the pedal component 20 in swinging toward the front wall 50. If the rotation angle becomes smaller than the first angle θ1 when the clutch pedal 21 returns, the first straight line L is likely to return to the reference straight line L0 with assistance by the second elastic member 35.

With reference to FIGS. 3, 7, and 9 to 11, the pedal component 20 has a recess 20r that is in contact with the second shaft 27 when the first straight line L1 is positioned on the reference straight line L0. In this configuration, the recess 20r serves as a receiver of the second shaft 27, and the second shaft 27 can be positioned ahead of the cabin 5.

Advantages of the Present Embodiment

The work vehicle 1 according to the present embodiment includes the clutch pedal 21 supported by the shaft 26 so as to be swingable about the center axis A1, and the flexible control cable 40 that has the outer tube 41 and the inner cable 42 slidably inserted to the outer tube 41 and is wound on the partition wall 50 of the cabin 5. The first longitudinal end 41t of the outer tube 41 is connected to the cabin 5, and the second longitudinal end 41b of the outer tube 41 is connected to the clutch housing 70. The second longitudinal end 17b of the inner cable 42 is connected to the clutch pedal 21 whereas the first longitudinal end 17a of the inner cable 42 is connected to the clutch lever 71. This configuration inhibits disconnection and connection of the clutch 7 unintended by the operator riding the clutch. The user can thus easily operate the clutch pedal 21.

The work vehicle 1 further includes the second elastic member 35 configured to swing the connection end 31 of the first link 30 about the second rotary axis A2 to bias the connection end 31 toward the front wall 50. In the nonoperation state where no external force is applied to the clutch pedal 21, the first straight line L0 passing the first rotary axis A1 and the third rotary axis A3 crosses the line segment SL connecting the second rotary axis A2 and the fourth rotary axis A4 when viewed in the axial direction Dx along the first rotary axis A1. The connection end 31 of the first link 30 shifts toward the front wall 50 when viewed in the axial direction Dx as the rotation angle made by the reference straight line L0 as the first straight line L in the nonoperation state and the first straight line L passing the third rotary axis A3 shifted due to application of external force to the clutch pedal 21 becomes larger than the first angle θ1. The second elastic member 35 can thus assist in pressing the clutch pedal 21 and achieve improvement in operability of the clutch pedal 21.

Modification Example

Figure 12:
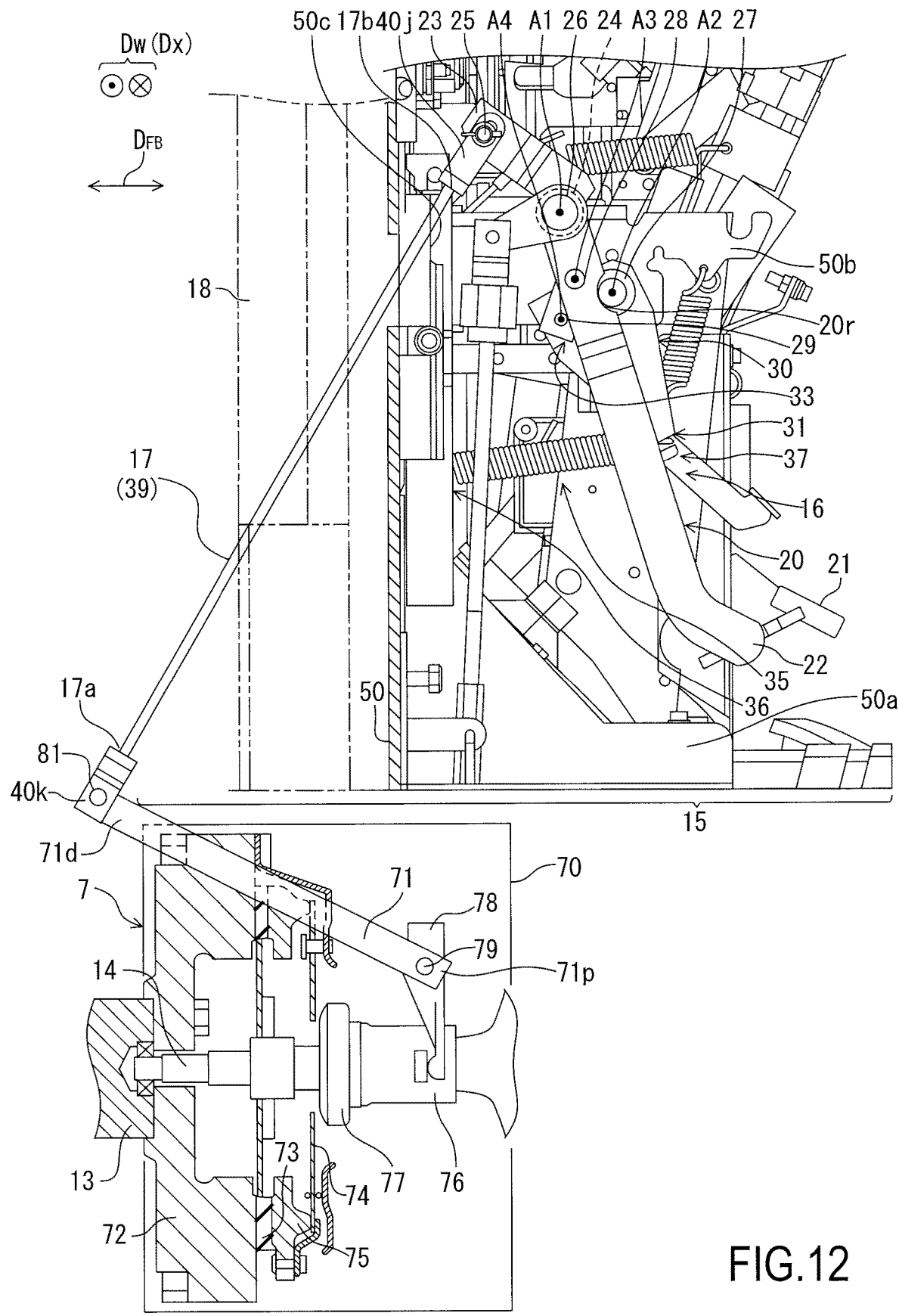
FIG. 12 is a diagram of a clutch and a clutch operation device according to a modification example.

The clutch operation mechanism 17 according to the embodiment described above is configured as the control cable 40. The clutch operation mechanism 17 may alternatively be configured as a rod 39 as depicted in FIG. 12. The second elastic member 35 still effectively assists in pressing the clutch pedal 21 also in this case.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
a cabin;
a clutch including a clutch housing and a clutch lever swingably provided at the clutch housing;
a shaft supported by the cabin and having a center axis;
a clutch pedal supported by the shaft so as to be swingable about the center axis;
a control cable including an outer tube and an inner cable slidably inserted to the outer tube, the control cable being wound on a partition wall of the cabin and having flexibility;
at least one latch member configured to latch the control cable onto the partition wall of the cabin; and
at least one retain member configured to restrict the control cable from swelling within a winding region of the partition wall, wherein
the clutch is disconnected or connected when the clutch lever swings,
the outer tube has a first longitudinal end connected to the cabin and a second longitudinal end connected to the clutch housing,
the inner cable has a first longitudinal end connected to the clutch pedal and a second longitudinal end connected to the clutch lever, and
the at least one retain member includes an outer periphery regulating plate defining at least part of an outer periphery of the winding region and extending from the partition wall of the cabin.

2. The work vehicle according to claim 1, wherein the at least one retain member further includes a front regulating plate connected to the outer periphery regulating plate and extending substantially in parallel with the partition wall of the cabin from the outer periphery regulating plate toward a center of the winding region.

3. A work vehicle comprising:
a cabin;
a clutch including a clutch housing and a clutch lever swingably provided at the clutch housing;
a shaft supported by the cabin and having a center axis;
a clutch pedal supported by the shaft so as to be swingable about the center axis;
a control cable including an outer tube and an inner cable slidably inserted to the outer tube, the control cable being wound on a partition wall of the cabin and having flexibility;
at least one latch member configured to latch the control cable onto the partition wall of the cabin;
at least one retain member configured to restrict the control cable from swelling within a winding region of the partition wall; and
a clamp latched to one of the at least one latch member and wound around the control cable, wherein
the clutch is disconnected or connected when the clutch lever swings,
the outer tube has a first longitudinal end connected to the cabin and a second longitudinal end connected to the clutch housing, and
the inner cable has a first longitudinal end connected to the clutch pedal and a second longitudinal end connected to the clutch lever.

4. The work vehicle according to claim 2, wherein the front regulating plate has a radial length with respect to the center of the winding region, and the radial length is larger than an anteroposterior length of the outer periphery regulating plate.

5. The work vehicle according to claim 1, further comprising:
a second shaft supported by the partition wall and having a second rotary axis substantially in parallel with the center axis;
a clutch operation mechanism including the control cable and having a first end as the first longitudinal end of the inner cable and a second end as the second longitudinal end of the inner cable;
a pedal component supported by the shaft so as to be swingable about the center axis and having a third end and a fourth end positioned opposite to the third end with respect to the shaft, the third end being provided with the clutch pedal, and the fourth end being connected to the second end of the clutch operation mechanism;
a first pin provided at the pedal component between the shaft and the third end of the pedal component, and having a third rotary axis substantially in parallel with the center axis;
a first elastic member to bias the clutch operation mechanism such that the fourth end of the pedal component shifts toward the clutch;
a first link supported by the second shaft so as to be swingable about the second rotary axis and having a connection end;
a second pin provided at the first link and having a fourth rotary axis substantially in parallel with the second rotary axis;
a second elastic member having a fifth end connected to the partition wall and a sixth end positioned opposite to the fifth end and connected to the connection end of the first link to swing the connection end about the second rotary axis to bias the connection end toward the partition wall; and
a second link rotatably coupled to the first pin and the second pin; wherein
in a nonoperation state where no external force is applied to the clutch pedal, a first straight line passing the center axis and the third rotary axis crosses a line segment connecting the second rotary axis and the fourth rotary axis when viewed in an axial direction along the center axis,
as a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

6. A work vehicle comprising:
a cabin;
a clutch including a clutch housing and a clutch lever swingably provided at the clutch housing;

a shaft supported by the cabin and having a center axis;

a clutch pedal supported by the shaft so as to be swingable about the center axis;

a clutch operation mechanism comprising:
- a control cable including an outer tube and an inner cable slidably inserted to the outer tube, the control cable being wound on a partition wall of the cabin and having flexibility, the outer tube having a first longitudinal end connected to the cabin and a second longitudinal end connected to the clutch housing, the inner cable having a first longitudinal end connected to the clutch pedal and a second longitudinal end connected to the clutch lever;
- a first end which is the first longitudinal end of the inner cable; and
- a second end which is the second longitudinal end of the inner cable;

a second shaft supported by the partition wall and having a second rotary axis substantially in parallel with the center axis;

a pedal component supported by the shaft so as to be swingable about the center axis and having a third end and a fourth end positioned opposite to the third end with respect to the shaft, the third end being provided with the clutch pedal, and the fourth end being connected to the second end of the clutch operation mechanism;

a first pin provided at the pedal component between the shaft and the third end of the pedal component, and having a third rotary axis substantially in parallel with the center axis;

a first elastic member to bias the clutch operation mechanism such that the fourth end of the pedal component shifts toward the clutch;

a first link supported by the second shaft so as to be swingable about the second rotary axis and having a connection end;

a second pin provided at the first link and having a fourth rotary axis substantially in parallel with the second rotary axis;

a second elastic member having a fifth end connected to the partition wall and a sixth end positioned opposite to the fifth end and connected to the connection end of the first link to swing the connection end about the second rotary axis to bias the connection end toward the partition wall; and a second link rotatably coupled to the first pin and the second pin; wherein the clutch is disconnected or connected when the clutch lever swings, in a nonoperation state where no external force is applied to the clutch pedal, a first straight line passing the center axis and the third rotary axis crosses a line segment connecting the second rotary axis and the fourth rotary axis when viewed in an axial direction along the center axis, as a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

7. The work vehicle according to claim 6, wherein
when the rotation angle is equal to the first angle, the center axis, the third rotary axis, and the fourth rotary axis are aligned on a single straight line when viewed in the axial direction.

8. The work vehicle according to claim 6, wherein
the shaft is positioned between the partition wall and the second shaft in a direction perpendicular to the partition wall of the cabin.

9. The work vehicle according to claim 6, wherein
when viewed in the axial direction, the fourth rotary axis and the third rotary axis have a first distance shorter than a second distance between the third rotary axis and the center axis.

10. The work vehicle according to claim 9, wherein
when viewed in the axial direction, the first distance is shorter than a third distance between the fourth rotary axis and the second rotary axis.

11. The work vehicle according to claim 10, wherein
when viewed in the axial direction, the third distance is shorter than a fourth distance between the fourth rotary axis and the connection end.

12. The work vehicle according to claim 6, wherein
when viewed in the axial direction, an angle made by a line segment extending from the second rotary axis to the fourth rotary axis and a line segment extending from the second rotary axis to the connection end is less than 90 degrees.

13. The work vehicle according to claim 6, wherein
the pedal component has a recess that is in contact with the second shaft when the first straight line is positioned on the reference straight line.

14. The work vehicle according to claim 1, further comprising
a clamp latched to one of the at least one latch member and wound around the control cable.

15. The work vehicle according to claim 2, further comprising
a clamp latched to one of the at least one latch member and wound around the control cable.

16. The work vehicle according to claim 2, further comprising:
a second shaft supported by the partition wall and having a second rotary axis substantially in parallel with the center axis;

a clutch operation mechanism including the control cable and having a first end as the first longitudinal end of the inner cable and a second end as the second longitudinal end of the inner cable;

a pedal component supported by the shaft so as to be swingable about the center axis and having a third end and a fourth end positioned opposite to the third end with respect to the shaft, the third end being provided with the clutch pedal, and the fourth end being connected to the second end of the clutch operation mechanism;

a first pin provided at the pedal component between the shaft and the third end of the pedal component, and having a third rotary axis substantially in parallel with the center axis;

a first elastic member to bias the clutch operation mechanism such that the fourth end of the pedal component shifts toward the clutch;

a first link supported by the second shaft so as to be swingable about the second rotary axis and having a connection end;

a second pin provided at the first link and having a fourth rotary axis substantially in parallel with the second rotary axis;

a second elastic member having a fifth end connected to the partition wall and a sixth end positioned opposite to the fifth end and connected to the connection end of the first link to swing the connection end about the second rotary axis to bias the connection end toward the partition wall; and a second link rotatably coupled to the first pin and the second pin; wherein in a nonoperation state where no external force is applied to the clutch pedal, a first straight line passing the center axis and the third rotary axis crosses a line segment connecting the second rotary axis and the fourth rotary axis when viewed in an axial direction along the center axis, as a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

17. The work vehicle according to claim 3, further comprising:

a second shaft supported by the partition wall and having a second rotary axis substantially in parallel with the center axis;

a clutch operation mechanism including the control cable and having a first end as the first longitudinal end of the inner cable and a second end as the second longitudinal end of the inner cable;

a pedal component supported by the shaft so as to be swingable about the center axis and having a third end and a fourth end positioned opposite to the third end with respect to the shaft, the third end being provided with the clutch pedal, and the fourth end being connected to the second end of the clutch operation mechanism;

a first pin provided at the pedal component between the shaft and the third end of the pedal component, and having a third rotary axis substantially in parallel with the center axis;

a first elastic member to bias the clutch operation mechanism such that the fourth end of the pedal component shifts toward the clutch;

a first link supported by the second shaft so as to be swingable about the second rotary axis and having a connection end;

a second pin provided at the first link and having a fourth rotary axis substantially in parallel with the second rotary axis;

a second elastic member having a fifth end connected to the partition wall and a sixth end positioned opposite to the fifth end and connected to the connection end of the first link to swing the connection end about the second rotary axis to bias the connection end toward the partition wall; and a second link rotatably coupled to the first pin and the second pin; wherein in a nonoperation state where no external force is applied to the clutch pedal, a first straight line passing the center axis and the third rotary axis crosses a line segment connecting the second rotary axis and the fourth rotary axis when viewed in an axial direction along the center axis, as a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

18. The work vehicle according to claim 4, further comprising:

a second shaft supported by the partition wall and having a second rotary axis substantially in parallel with the center axis;

a clutch operation mechanism including the control cable and having a first end as the first longitudinal end of the inner cable and a second end as the second longitudinal end of the inner cable;

a pedal component supported by the shaft so as to be swingable about the center axis and having a third end and a fourth end positioned opposite to the third end with respect to the shaft, the third end being provided with the clutch pedal, and the fourth end being connected to the second end of the clutch operation mechanism;

a first pin provided at the pedal component between the shaft and the third end of the pedal component, and having a third rotary axis substantially in parallel with the center axis;

a first elastic member to bias the clutch operation mechanism such that the fourth end of the pedal component shifts toward the clutch;

a first link supported by the second shaft so as to be swingable about the second rotary axis and having a connection end;

a second pin provided at the first link and having a fourth rotary axis substantially in parallel with the second rotary axis;

a second elastic member having a fifth end connected to the partition wall and a sixth end positioned opposite to the fifth end and connected to the connection end of the first link to swing the connection end about the second rotary axis to bias the connection end toward the partition wall; and a second link rotatably coupled to the first pin and the second pin; wherein in a nonoperation state where no external force is applied to the clutch pedal, a first straight line passing the center axis and the third rotary axis crosses a line segment connecting the second rotary axis and the fourth rotary axis when viewed in an axial direction along the center axis, as a rotation angle made by a reference straight line as the first straight line in the nonoperation state and the first straight line passing the third rotary axis shifted due to application of the external force to the clutch pedal becomes larger than a first angle, the connection end of the first link shifts toward the partition wall when viewed in the axial direction.

* * * * *